Sept. 28, 1937.  G. C. ABBE  2,094,515
SCRAPER
Filed Sept. 21, 1936   2 Sheets-Sheet 2

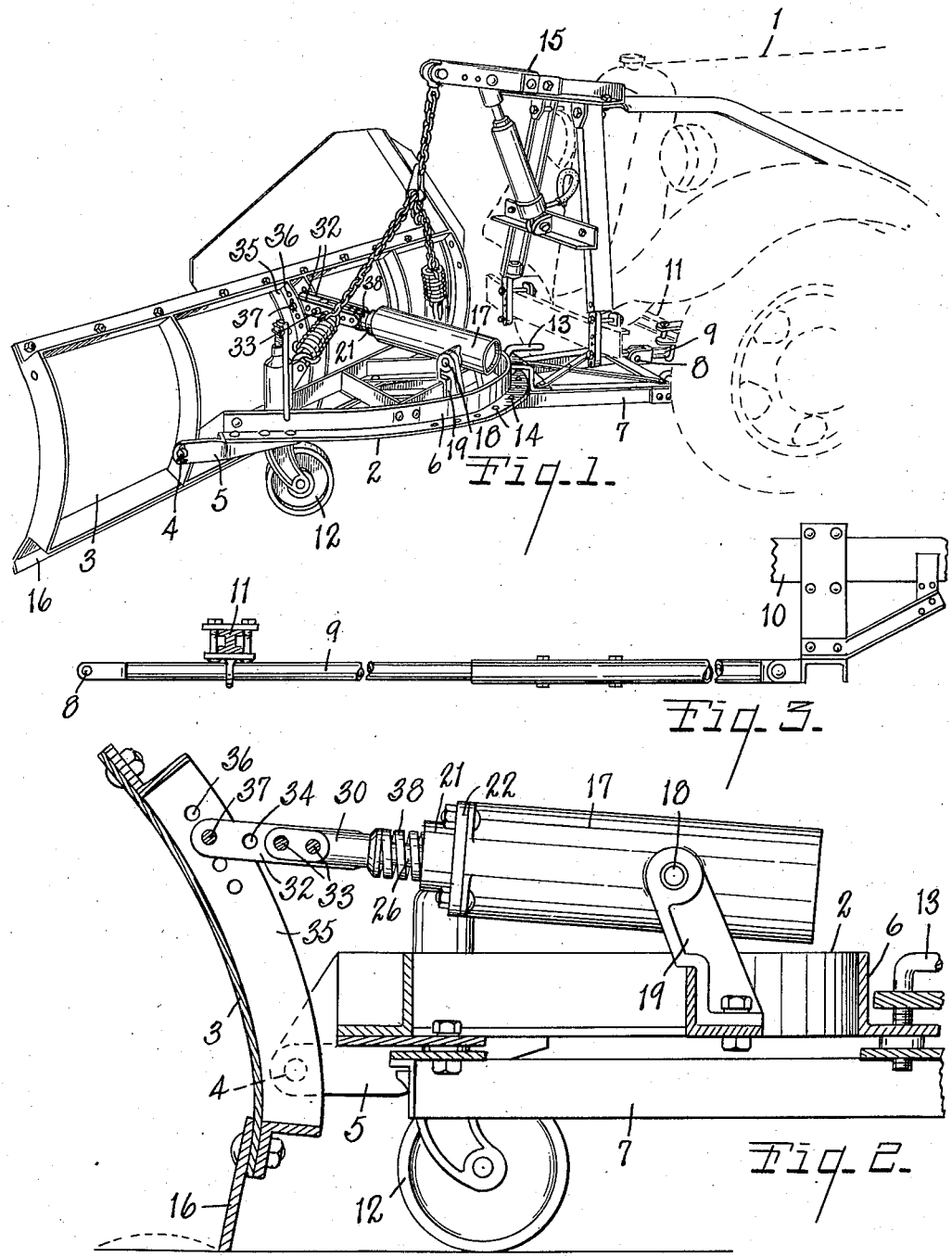

INVENTOR.
George C. Abbe
BY Chappell, Earl & Chappell
ATTORNEYS

Patented Sept. 28, 1937

2,094,515

UNITED STATES PATENT OFFICE 2,094,515

SCRAPER

George C. Abbe, Lansdowne, Pa., assignor to Good Roads Machinery Corporation, Kennett Square, Pa.

Application September 21, 1936, Serial No. 101,775

12 Claims. (Cl. 37—42)

The main objects of this invention are:

First, to provide a scraper adapted for use as a snow plow and for scraping purposes generally in which the scraper is supported to yield under undue stresses applied to its scraping edge such as results from coming in contact with a fixed object such as a manhole, car rail or other obstruction in a pavement.

Second, to provide a structure having these advantages in which the blade of the scraper is supported to yield under conditions stated with an improved spring supporting means.

Third, to provide a spring supporting means for yieldingly supporting the scraper blade in operative position in which the springs are effectively housed and arranged so that the scraper blade has considerable scope of movement without becoming subject to undue spring tension.

Objects pertaining to details and economies of the invention will definitely appear from the description to follow. The invention is defined in the claims.

A structure which embodies the features of my invention is clearly illustrated in the accompanying drawings, in which:

Fig. 1 is a perspective view of a scraper embodying the features of my invention mounted on a motor vehicle such as a truck, the vehicle being indicated by dotted lines.

Fig. 2 is an enlarged fragmentary view partially in vertical section.

Fig. 3 is a fragmentary view illustrating details of the mounting on a truck or propelling vehicle.

Figure 4:
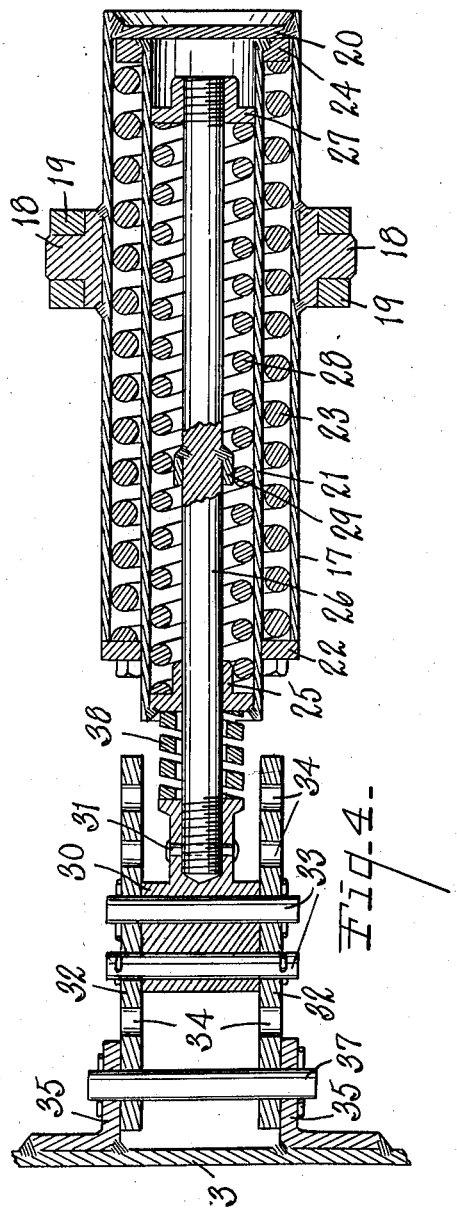
Fig. 4 is an enlarged fragmentary view mainly in section on line 4—4 of Fig. 5.
Figure 5:
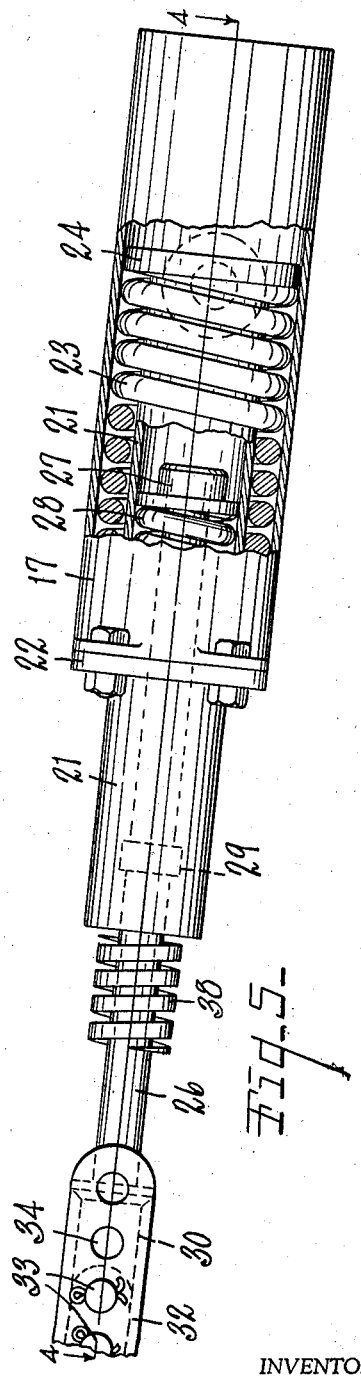
Fig. 5 is a fragmentary view partially in section showing the spring device partially extended.

I illustrate by dotted lines at 1 a motor vehicle in order to illustrate my improvements in an operative relation. The scraper proper comprises a truck designated generally by the numeral 2 and the scraper blade or plow 3 which is pivotally mounted at 4 on forwardly projecting arms or brackets 5 on the truck. The truck comprises a turn table portion 6 which is pivoted on the front end of the truck frame 7 which is pivoted at 8 on the forward ends of the supporting bars 9 mounted on the under side of the chassis of the vehicle. A portion of the vehicle frame is indicated at 10 and its front axle at 11.

The turn table portion of the frame is provided with caster wheels 12 and is held in its adjusted position by the pin 13 selectively engaged in the holes 14. The scraper carriage may be raised and lowered by means of a jack designated generally by the numeral 15. However, as this jack forms no part of my present invention, it is not illustrated herein.

In order to permit the scraper to yield or swing on its pivots in the event its lower or scraping edge 16 comes into contact with a fixed obstruction, such as a manhole in the pavement or other projecting object, the scraper blade is yieldingly supported in operative or erected position by means of my improved spring device comprising a tubular support member 17 having journals or pivots 18 engaging in the brackets 19 on the carriage. This tubular support 17 is provided with a rear end wall 20 which also constitutes a stop for the tubular plunger 21 which is telescopingly associated with the support. At its front end the support 17 is provided with a flange-like member 22 which constitutes a rest for the front end of the spring 23 arranged within the support to embrace the plunger. At its rear end the plunger is provided with a thrust collar or thrust member 24 for the rear end of the spring 23.

It will be noted that the spring acts to urge the plunger to its collapsed or fully telescoped position and that the end wall 20 serves as a stop for the retracting movement of the plunger.

At its front end the plunger is provided with an integral thrust member 25 which is extended to provide a bearing for the connecting rod 26 which is telescopingly associated with the plunger. This connecting rod is provided with a thrust collar 27 at its rear end which slidably engages the plunger member and serves as a thrust member for the coiled spring 28 which is arranged within the plunger member to embrace the connecting rod, the front end of this spring being in supporting engagement with the thrust member 25 of the plunger.

A stop 29 is welded to the connecting rod and coacts with the member 25 to limit the extending movement of the connecting rod and thus the collapsing movement of the spring 28. At its forward end the connecting rod is provided with a T shaped coupling head 30 which is threaded upon the coupling rod and also secured thereto by the pin 31. This coupling head is adjustably connected to the links 32 by means of the coupling pins 33 disposed through the coupling head and selectively engageable with a longitudinal series of holes 34 in the links. These links are adjustably connected to the scraper blade which is provided with a pair of spaced vertical bars 35 having a series of vertical spaced holes 36 with which the coupling pin 37 may be selectively engaged. The links 32 are, in effect, extension members and the head might be engaged directly by the coupling pin 37.

A buffer or shock absorbing spring 38 is provided and disposed upon the connecting rod 26 between the coupling head thereof and the thrust member 25 on the plunger member. If desired the tubular plunger 21 may be extended to provide a housing for the buffer spring.

With this arrangement of parts the scraper blade is effectively supported in operative position and at the same time may swing on its pivots to pass over fixed obstructions or objects which would be likely to damage the machine if the scraper were unyieldingly supported. It may pass over objects of considerable height inasmuch as the spring structure shown permits a very wide range of movement without unduly increasing the tension of the spring. Further, the springs are effectively housed, and the apparatus is quite compact, notwithstanding its scope.

I have illustrated and described my improvements in a commercial embodiment which I have found highly satisfactory. I have not attempted to illustrate or describe certain modifications or adaptations which I contemplate as it is believed this disclosure will enable those skilled in the art to embody or adapt my improvements as may be desired.

Having thus described my invention what I claim as new and desire to secure by Letters Patent:

1. In a scraper, the combination of a carriage, a scraper blade pivotally mounted on said carriage, means for yieldingly supporting said scraper blade in operative position while permitting it to swing on its pivot under undue resistance applied to its scraping edge comprising a tubular support closed at its rear end pivotally mounted on said carriage and provided with a spring thrust member at its front end, a tubular plunger slidable within said support and provided with an external spring thrust member at its rear end and with an internal spring thrust member at its front end, a coiled spring arranged within said support to embrace said plunger with its ends in cooperating supporting relation to said thrust members on said support and plunger, the closed rear end of said support constituting a stop for said plunger, a connecting rod slidable in said plunger and having a spring thrust member at its rear end and a coupling head at its front end, a coiled spring arranged within said plunger to embrace said connecting rod and in supporting relation to said spring thrust members on the rear end of said rod and at the front end of said plunger, a coiled buffer spring arranged on said connecting rod between said coupling head and said thrust member at the front end of said plunger, a stop on said connecting rod coacting with said thrust member at the front end of said plunger for limiting the forward movement of said connecting rod relative to the plunger, spaced vertical bars on the rear side of said scraper blade provided with a series of vertically spaced holes, coupling links provided with a series of longitudinally spaced holes, a coupling pin for connecting said links to said scraper selectively engageable with said holes in said bars, and a coupling pin for connecting said links to said coupling head selectively engageable with the holes of said links.

2. In a scraper, the combination of a carriage, a scraper blade pivotally mounted on said carriage, means for yieldingly supporting said scraper blade in operative position while permitting it to swing on its pivot under undue resistance applied to its scraping edge comprising a tubular support closed at its rear end pivotally mounted on said carriage and provided with a spring thrust member at its front end, a tubular plunger slidable within said support and provided with an external spring thrust member at its rear end and with an internal spring thrust member at its front end, a coiled spring arranged within said support to embrace said plunger with its ends in cooperating supporting relation to said thrust members on said support and plunger, the closed rear end of said support constituting a stop for said plunger, a connecting rod slidable in said plunger and having a spring thrust member at its rear end and a coupling head at its front end, a coiled spring arranged within said plunger to embrace said connecting rod and in supporting relation to said spring thrust members on the rear end of said rod and at the front end of said plunger, spaced vertical bars on the rear side of said scraper blade provided with a series of vertically spaced holes, coupling links provided with a series of longitudinally spaced holes, a coupling pin for connecting said links to said scraper selectively engageable with said holes in said bars, and a coupling pin for connecting said links to said coupling head selectively engageable with the holes of said links.

3. In a scraper, the combination of a carriage, a scraper blade pivotally mounted on said carriage, means for yieldingly supporting said scraper blade in operative position while permitting it to swing on its pivot under undue resistance applied to its scraping edge comprising a tubular support closed at its rear end pivotally mounted on said carriage and provided with a spring thrust member at its front end, a tubular plunger slidable within said support and provided with an external spring thrust member at its rear end and with an internal spring thrust member at its front end, a coiled spring arranged within said support to embrace said plunger with its ends in cooperating supporting relation to said thrust members on said support and plunger, the closed rear end of said support constituting a stop for said plunger, a connecting rod slidable in said plunger and having a spring thrust member at its rear end, a coiled spring arranged within said plunger to embrace said connecting rod and in supporting relation to said spring thrust members on the rear end of said rod and at the front end of said plunger, a coiled buffer spring arranged on said connecting rod between said coupling head and said thrust member at the front end of said plunger, a stop on said connecting rod coacting with said thrust member at the front end of said plunger for limiting the forward movement of said connecting rod relative to the plunger, and means for connecting said connecting rod to said scraper blade.

4. In a scraper, the combination of a carriage, a scraper blade pivotally mounted on said carriage, means for yieldingly supporting said scraper blade in operative position while permitting it to swing on its pivot under undue resistance applied to its scraping edge comprising a tubular support closed at its rear end pivotally mounted on said carriage and provided with a spring thrust member at its front end, a tubular plunger slidable within said support and provided with an external spring thrust member at its rear end and with an internal spring thrust member at its front end, a coiled spring arranged within said support to embrace said plunger with its ends in cooperating supporting relation to said thrust members on said support and plunger, the closed rear end of said support constituting a stop for said plunger, a connecting rod slidable in said plunger and having a spring thrust member at its rear end, a coiled spring arranged within said plunger to embrace said connecting rod and in supporting relation to said spring thrust members on the rear end of said rod and at the front end of said plunger, and means for connecting said connecting rod to said scraper blade.

5. In a scraper, the combination of a carriage, a scraper blade pivotally mounted on said carriage, means for yieldingly supporting said scraper blade in operative position while permitting it to swing on its pivot under undue resistance applied to its scraping edge, comprising a support pivotally mounted on said carriage and provided with a spring thrust member at its front end, a plunger slidably associated with said support and provided with an external spring thrust member at its rear end and with an internal spring thrust member at its front end, a coiled spring arranged to embrace said plunger with its ends in cooperating supporting relation to said thrust members on said support and plunger, a connecting rod slidably associated with said plunger and having a spring thrust member at its rear end and a coupling head at its front end, a coiled spring arranged to embrace said connecting rod and in supporting relation to said spring thrust member on the rear end of said rod and at the front end of said plunger, a coiled buffer spring arranged on said connecting rod between said coupling head and said thrust member at the front end of said plunger, a stop on said connecting rod coacting with said thrust member at the front end of said plunger for limiting the forward movement of said connecting rod relative to the plunger, and means for adjustably connecting said coupling head to said scraper blade.

6. In a scraper, the combination of a carriage, a scraper blade pivotally mounted on said carriage, means for yieldingly supporting said scraper blade in operative position while permitting it to swing on its pivot under undue resistance applied to its scraping edge, comprising a support pivotally mounted on said carriage and provided with a spring thrust member at its front end, a plunger slidably associated with said support and provided with an external spring thrust member at its rear end and with an internal spring thrust member at its front end, a coiled spring arranged to embrace said plunger with its ends in cooperating supporting relation to said thrust members on said support and plunger, a connecting rod slidably associated with said plunger and having a spring thrust member at its rear end, a coiled spring arranged to embrace said connecting rod and in supporting relation to said spring thrust member on the rear end of said rod and at the front end of said plunger, a stop on said connecting rod coacting with said thrust member at the front end of said plunger for limiting the forward movement of said connecting rod relative to the plunger, and means for connecting said connecting rod to said scraper blade.

7. In a scraper, the combination of a carriage, a scraper blade pivotally mounted on said carriage, means for yieldingly supporting said scraper blade in operative position while permitting it to swing on its pivot under undue resistance applied to its scraping edge, comprising a support pivotally mounted on said carriage and provided with a spring thrust member at its front end, a plunger slidably associated with said support and provided with an external spring thrust member at its rear end and with an internal spring thrust member at its front end, a coiled spring arranged to embrace said plunger with its ends in cooperating supporting relation to said thrust members on said support and plunger, a connecting rod slidably associated with said plunger and having a spring thrust member at its rear end and a coupling head at its front end, a coiled spring arranged to embrace said connecting rod in supporting relation to said spring thrust member on the rear end of said rod and at the front end of said plunger, a coiled buffer spring arranged on said connecting rod between said coupling head and said thrust member at the front end of said plunger, and means for adjustably connecting said coupling head to said scraper blade.

8. In a scraper, the combination of a carriage, a scraper blade pivotally mounted on said carriage, means for yieldingly supporting said scraper blade in operative position while permitting it to swing on its pivot under undue resistance applied to its scraping edge, comprising a support provided with pivots, bearings on said carriage for said pivots, said support being provided with a spring thrust member at its front end, a plunger slidably associated with said support and provided with an external spring thrust member at its rear end and with an internal spring thrust member at its front end, a coiled spring arranged to embrace said plunger with its ends in cooperating supporting relation to said thrust members on said support and plunger, a connecting rod slidably associated with said plunger and having a spring thrust member at its rear end, a coiled spring arranged to embrace said connecting rod and in supporting relation to said spring thrust member on the rear end of said rod and at the front end of said plunger, and means for connecting said connecting rod to said scraper blade.

9. In a scraper, the combination of a carriage, a scraper blade pivotally mounted on said carriage, means for yieldingly supporting said scraper blade in operative position while permitting it to swing on its pivot under undue resistance applied to its scraping edge, comprising a plurality of telescopingly-associated members, a plurality of coiled springs operatively associated with said members and acting to urge the members to telescoped position, the outer of said members constituting a housing and being provided with pivots, bearings on said carriage for said pivots, the inner of said telescoping members being adjustably connected to said scraper, and a buffer spring operatively associated with the member connected to said scraper.

10. In a scraper, the combination of a carriage, a scraper blade pivotally mounted on said carriage, means for yieldingly supporting said scraper blade in operative position while permitting it to swing on its pivot under undue resistance applied to its scraping edge, comprising a plurality of telescopingly-associated members, a plurality of coiled springs operatively associated with said members and acting to urge the members to telescoped position, the outer of said members constituting a housing and being provided with pivots, bearings on said carriage for said pivots, the inner of said telescoping members being connected to said scraper.

11. In a scraper, the combination of a carriage, a scraper blade pivotally mounted on said carriage, means for yieldingly supporting said scraper blade in operative position while permitting it to swing on its pivot under undue resistance applied to its scraping edge comprising a plurality of telescopingly-associated members, a plurality of coiled springs operatively associated with said members and acting to urge the members to telescoped position, one of said members being provided with a pivot engaging a relatively fixed bearing mounted on said carriage, the telescoping member at the other end of the series being connected to said scraper, and a buffer spring operatively associated with the member connected to said scraper.

12. In a scraper, the combination of a carriage, a scraper blade pivotally mounted on said carriage, means for yieldingly supporting said scraper blade in operative position while permitting it to swing on its pivot under undue resistance applied to its scraping edge, comprising a plurality of telescopingly-associated members, a plurality of coiled springs operatively associated with said members and acting to urge the members to telescoped position, one of said members being provided with a pivot engaging a relatively fixed bearing mounted on said carriage, the telescoping member at the other end of the series being connected to said scraper.

GEORGE C. ABBE.